Patented Mar. 30, 1937

2,075,390

UNITED STATES PATENT OFFICE 2,075,390

BEE POISON PREPARATION

Karl August Forster, Illertissen, Germany

No Drawing. Application May 3, 1934, Serial No. 723,729. In Germany June 20, 1933

6 Claims. (Cl. 167—63)

The therapeutic effect of bee poison in the treatment of rheumatism and like ailments when applied subcutaneously or intracutaneously is known. When applied directly to the skin, however, bee poison has been quite ineffective.

It has therefore been necessary heretofore to inject the bee poison in order to utilize its therapeutic effects, but such injection is very painful and complicated and usually can be carried out only by a doctor. All attempts to apply bee poison in an effective form by other methods to diseased organisms have heretofore been unsuccessful.

I have now been able to ascertain that bee poison is also effective percutaneously if it is mixed with one or more cutaneous irritants, such as mustard oil, which are adapted to render the skin hyperaemic, and if such a mixture of substances is combined with animal fats and the like, which readily penetrate the epidermis. The considerable advantage of such an application, which renders injection of the poison unnecessary, is obvious.

This method of working, however, still suffers from some disadvantages. Thus, for example, the skin of many persons is very sensitive to the action of chemical irritants, such as mustard oil, dichlorethyl sulphide and so forth. Also, irritants such as mustard oil possess a very unpleasant odour, which deters some persons from using such remedies.

I have now found by further experiments that such chemical irritants may be successfully replaced by irritants or abradants of a mechanical nature. It is here not so much a question of a pure hyperaemia as rather of a microscopically fine injury to the epidermis, the absorption of the bee poison being effected still more quickly than with chemical irritants. Fine silicate crystals, powdered glass or even pulverized bee stings for example have been proved to be irritants or abradants of this mechanical nature. Such abrasive substances possess the advantage that they are cheaper than chemical abradants. These irritants of a mechanical nature are introduced into a mixture of substances which readily penetrate the skin, such as for example animal fats and the like, in which the bee poison is finely dispersed. Even about 5 per cent. of powdered glass is sufficient in order to obtain the desired effect (absorption of the bee poison).

A small rubber may be employed for use with this liniment or embrocation.

The following example illustrates the preparation of a salve in accordance with the invention:

50 ccm. of an aqueous solution of the poison obtained by the fresh evacuation of the little drops of 2000 live matured summer bees are emulsified with 720 g. of hydrolyzed wool fat at 45° C. and slowly stirred until cold, whereupon 38.5 g. of glass powder are worked uniformly into the salve mass.

The bee poison employed in the foregoing example is the pure, natural poison contained in the poison sacs of living honey bees, and may be conveniently obtained by catching the bees separately and allowing them to sting on paper. The paper is then subjected to extraction with water and a fully effective bee poison solution is thus obtained.

I claim:

1. The process of converting bee poison into a percutaneously effective form, wherein an ointment containing bee poison in dispersion is mixed with a cutaneous abradant of a mechanical nature.

2. The process of converting bee poison into a percutaneously effective form, wherein an ointment containing bee poison in fine dispersion is mixed with a mechanical skin abradant consisting of fine silicate crystals.

3. The process of converting bee poison into a percutaneously effective form, wherein an ointment containing bee poison in fine dispersion is mixed with a mechanical skin abradant consisting of powdered glass.

4. An ointment comprising an animal fat, bee poison dispersed in said fat, and a powdered abrasive substance for rendering the bee poison effective upon application of the ointment to the skin by rubbing.

5. The process of rendering bee poison percutaneously effective, which comprises forming a fine dispersion of bee poison in an unguent and distributing therethrough finely divided abrasive grains.

6. The process of rendering bee poison percutaneously effective, which comprises forming a fine dispersion of bee poison in lanolin and distributing therethrough finely divided abrasive grains.

KARL AUGUST FORSTER.